United States Patent [19]

Blanchet

[11] Patent Number: 5,694,026
[45] Date of Patent: Dec. 2, 1997

[54] TURBINE GENERATOR SET WITHOUT A STEP-DOWN GEAR BOX

[75] Inventor: Alain Blanchet, Grenoble, France

[73] Assignee: European Gas Turbines SA, Paris, France

[21] Appl. No.: 564,036

[22] PCT Filed: Apr. 12, 1995

[86] PCT No.: PCT/FR95/00475

§ 371 Date: Dec. 12, 1995

§ 102(e) Date: Dec. 12, 1995

[87] PCT Pub. No.: WO95/28764

PCT Pub. Date: Oct. 26, 1995

[30] Foreign Application Priority Data

Apr. 13, 1994 [FR] France ................. 94 04397

[51] Int. Cl.⁶ ........................................... H02P 9/42
[52] U.S. Cl. ............... 322/29; 322/11; 322/59; 290/27; 290/47; 307/153
[58] Field of Search ............................. 322/29, 47

[56] References Cited

U.S. PATENT DOCUMENTS

| | | | |
|---|---|---|---|
| 4,695,736 | 9/1987 | Doman et al. | 290/44 |
| 4,786,852 | 11/1988 | Cook | 322/10 |
| 4,812,730 | 3/1989 | Nakagawa et al. | 318/732 |
| 5,015,941 | 5/1991 | Dhyanchand | 322/10 |
| 5,281,905 | 1/1994 | Dhyanchand et al. | 322/32 |
| 5,391,975 | 2/1995 | Okubo | 322/28 |
| 5,552,640 | 9/1996 | Sutton et al. | 290/40 B |
| 5,559,421 | 9/1996 | Miyakawa | 322/58 |

*Primary Examiner*—Steven L. Stephan
*Assistant Examiner*—Nicholas Ponomarenko
*Attorney, Agent, or Firm*—Sughrue, Mion, Zinn, Macpeak & Seas, PLLC

[57] ABSTRACT

The invention relates to a turbine generator set comprising a turbine and a generator coupled to each other without a step-down gear box, and a static frequency converter connected in series between said generator and an AC electricity grid having a given operating frequency, said static frequency converter operating while the turbine generator set is generating electricity to convert the frequency of the voltage and of the current delivered by the generator into the given operating frequency of the AC electricity grid. According to the invention, while the turbine generator set is being started, said static frequency converter powers the generator which operates as a motor so as to ignite the combustion chambers of the turbine, by taking power from the AC electricity grid.

10 Claims, 2 Drawing Sheets

5,694,026

TURBINE GENERATOR SET WITHOUT A STEP-DOWN GEAR BOX

FIELD OF THE INVENTION

The present invention relates to electricity generator sets each comprising a turbine and a generator, e.g. a gas turbine driving an alternator.

BACKGROUND OF THE INVENTION

Gas turbines providing low or medium power (a few MW to a few tens of MW) are efficient when they rotate at high speeds (e.g. in the range 5,000 revolutions per minute (r.p.m.) to 15,000 r.p.m.). To deliver electricity at a mains frequency of 50 Hz, an alternator having 2 or 4 poles must rotate at a speed of 3,000 r.p.m. or 1,500 r.p.m. To obtain a frequency of 60 Hz with an alternator having 2 or 4 poles, the alternator must rotate at a speed of 3,600 r.p.m. or 1,800 r.p.m. Therefore, a step-down gear box must be provided between the gas turbine and the alternator. At such gas turbine powers, step-down gear boxes can be implemented industrially at acceptable costs and with good efficiency.

With higher power gas turbines (greater than 60 MW), such step-down gear boxes become very bulky and their cost is prohibitive. At very high powers, step-down gear boxes become impossible to implement, and the turbine then drives the alternator directly.

That is why, in order to use a 2-pole alternator supplying electricity directly at mains frequency, it is necessary to limit the speed of high-power gas turbines to 3,000 r.p.m. for 50 Hz, and to 3,600 r.p.m. for 60 Hz.

This reduces the overall efficiency of the gas turbine and alternator set.

It is also known that a gas turbine cannot start on its own because the air in its compressor portion must be compressed before fuel is injected into its combustion portion. Starting is obtained by means of an auxiliary electric motor or diesel engine, or by means of a starter static converter powered from the AC grid.

Turbine generator sets are known that are coupled together without a step-down gear box being provided, such sets being designed to deliver electricity to an AC electricity grid of given frequency. A static frequency converter is connected in series between the generator and the grid, which converter converts the voltage and the current delivered by the generator at a frequency that is different from the frequency of the grid into magnitudes corresponding to the frequency of the grid.

Such sets are described in Documents JP-A-58 212 367, JP-A-62 131 798, and JP-A-56 062 100. Such sets make it possible to mitigate the limit on the speed of high-power gas turbines.

SUMMARY OF THE INVENTION

An object of the present invention is to reduce the overall size of such above-described turbine generator sets by providing a turbine generator set comprising a turbine and a generator coupled to each other without a step-down gear box, and a static frequency converter connected in series between said generator and an AC electricity grid having a given operating frequency, said static frequency converter operating while the turbine generator set is generating electricity to convert the frequency of the voltage and of the current delivered by the generator into the given operating frequency of the AC electricity grid. According to the invention, while the turbine generator set is being started, said static frequency converter powers the generator which operates as a motor so as to ignite the combustion chambers of the turbine, by taking power from the AC electricity grid.

According to the invention, with the generator being an alternator including an inductor, and while the turbine generator set is generating electricity, said static frequency converter acts on said inductor so as to excite and/or regulate said alternator.

In an embodiment of the invention, the static frequency converter comprises two thyristor bridges controlled by measurement transformers for measuring the voltage and the current delivered by the generator.

Advantageously, the static frequency converter makes it possible to adjust the speed of rotation of the turbine generator set as a function of the load delivered to the AC electricity grid.

The generator may equally well be an alternator or an asynchronous generator.

One of the advantages of the present invention lies in the fact that a common static frequency converter makes it possible to perform a plurality of functions which were previously performed separately, and some of which required very bulky and low-performance devices.

Another advantage resulting from the above advantage lies in the space saving due to omitting electrical control cabinets dedicated to exciting/regulating the alternator, or to synchronizing the alternator with the grid, and in omitting the step-down gear box and the accessory starter devices for starting the gas turbine.

BRIEF DESCRIPTION OF THE DRAWINGS

The invention will be well understood on reading the following description of a preferred embodiment of the invention given with reference to the accompanying drawings, in which:

FIG. 1 shows a low or medium power gas turbine 10 driving an alternator 11 serving a grid 13 via a transformer 14. An alternator circuit-breaker 15 and a line circuit-breaker 16 flank the transformer.

Figure 1:
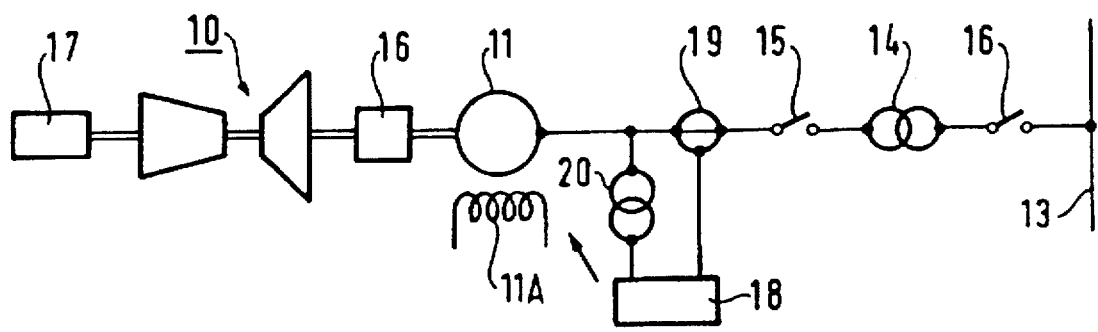
FIGS. 1 to 4 are one-wire electrical circuit diagrams of electricity generator sets, each of which comprises a gas turbine and an alternator, such as they exist in the prior art.

As shown, a step-down gear box 12 is inserted between the gas turbine 10 and the alternator 11, so that the alternator can rotate at a speed enabling it to operate at mains frequency.

A diesel engine or an electric motor 17 enables the set to be started, as explained above.

The alternator has an inductor 11A on which a regulation circuit 18 can act to regulate the alternator as a function of load.

The regulator circuit acts as a function of measurements of the current and of the voltage supplied by the alternator, the measurements being taken by means of measurement transformers 19 and 20.

Figure 2:
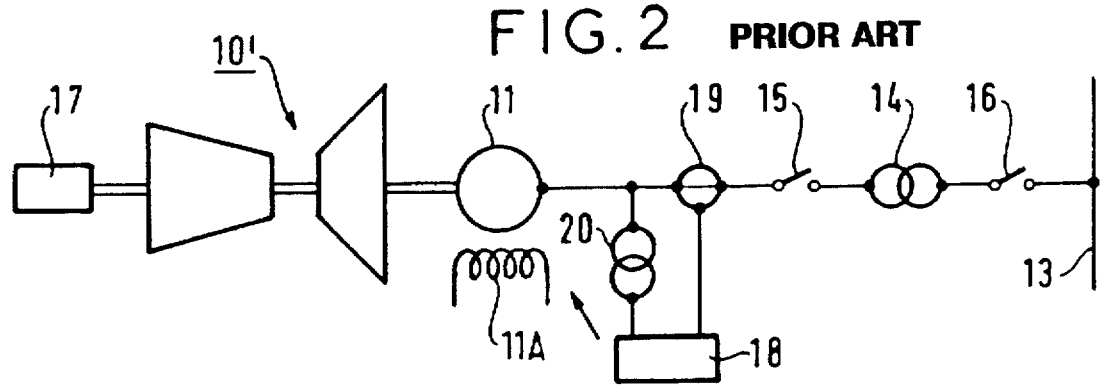

FIG. 2 shows a set which is analogous to the set shown in FIG. 1, but in which the gas turbine 10' is a high-power turbine, so that the step-down gear box 12 is omitted. The other elements of the set remain unchanged and are given the same numbers in FIG. 2 as the analogous elements in FIG. 1.

Figure 3:
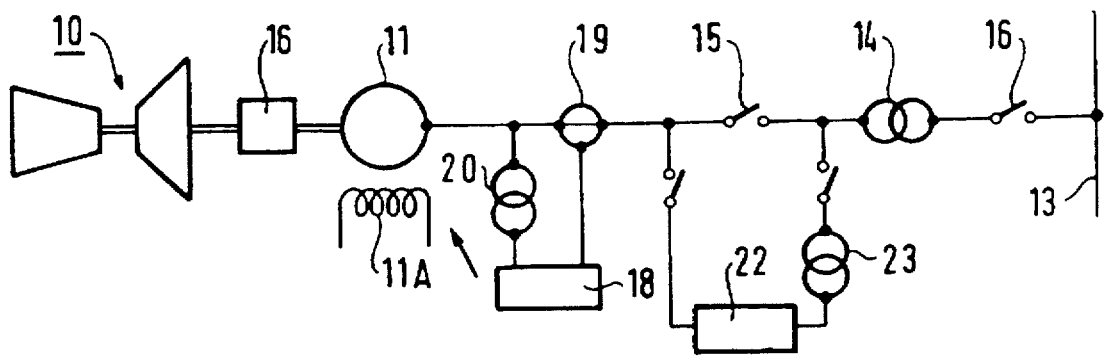

In FIG. 3, the gas turbine 10 is a low or medium power turbine, and it requires a step-down gear box 12, but the starter motor is omitted, with starting being performed by means of a starter static converter 22 comprising a thyristor bridge 22 powered from the grid via a tapping transformer 23.

The other elements of the set remain unchanged.

Figure 4:
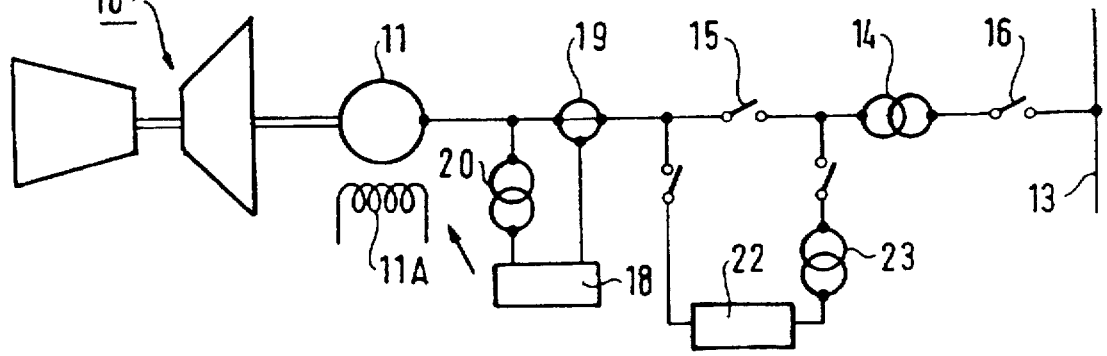

FIG. 4 shows a set in which the gas turbine 10' is a high-power turbine, and it is therefore coupled to the alternator 11 without a step-down gear box being inserted.

As in FIG. 3, the starter motor is omitted and replaced with a starter static converter 22.

DESCRIPTION OF THE PREFERRED EMBODIMENT

Figure 5:
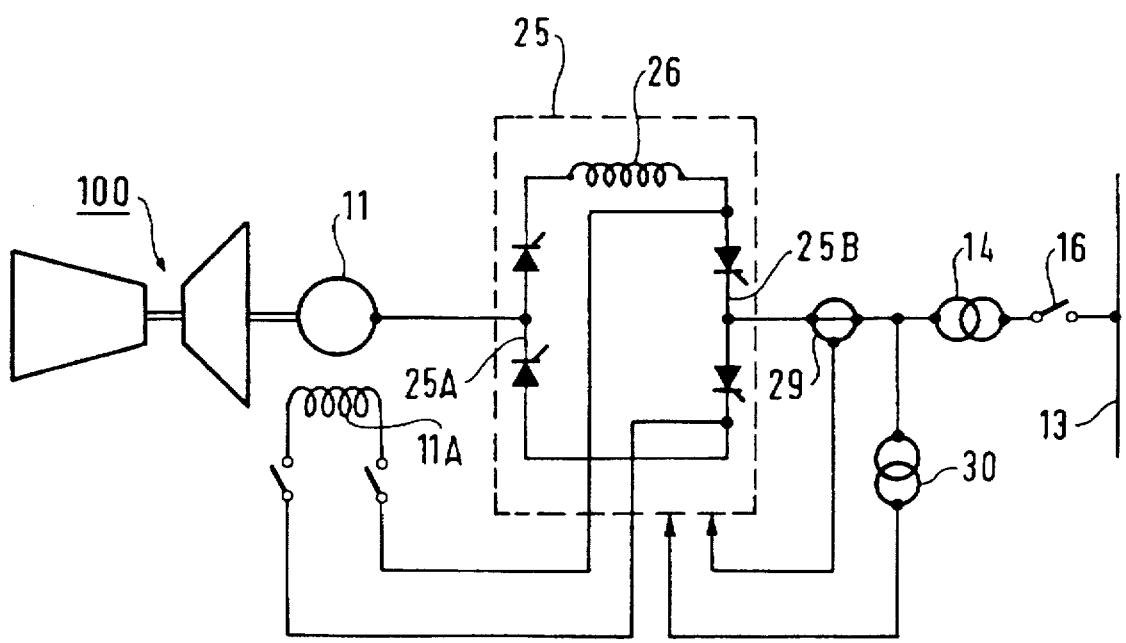
FIG. 5 is a one-wire electrical circuit diagram of an electricity generator set of the invention comprising a gas turbine and an alternator.

FIG. 5 shows an electricity generator set of the invention.

The gas turbine 100 is coupled directly to the alternator, and, regardless of its power, the turbine and alternator set can rotate at its optimum speed. For example, the gas turbine is a 40 MW turbine and, when it rotates at 5,100 r.p.m., the two-pole alternator supplies a frequency of 85 Hz.

The alternator is in series with a static frequency converter 25 (SFC), itself connected to the grid 13 via the transformer 14 and the line circuit-breaker 16.

The converter comprises two thyristor bridges 25A and 25B interconnected via an inductor 26.

The SFC is controlled on the basis of current and voltage measurements taken by means of the measurement transformers 29 and 30.

While the turbine generator set is generating electricity, the main function of the static frequency converter is to convert voltage and current delivered by the alternator at a frequency that is different from that of the grid (85 Hz in the above-mentioned example) into magnitudes corresponding to the frequency of the grid. In this way, the static frequency converter makes it possible for the power supplied by the alternator to be transmitted at the appropriate frequency.

In accordance with the invention, the SFC also has the following functions:

a) While the turbine generator set is generating electricity, the function of regulating and/or exciting the alternator, which function is assigned to special control cabinets in the prior art. To perform this function, it uses the data measured by the measurement transformers 29 and 30.

b) While the turbine generator set is being started, the function of tapping the grid so as to supply the current and frequency magnitudes for powering the generator which then operates as a motor. After the combustion chambers have been ignited, the static frequency converter is reversed so as to transmit the power supplied by the alternator to the grid. This function is made possible by the reversibility of the SFC.

An intermediate stage may exist during which the turbine starts to supply torque to the shaft, and the generator continues to operate as a motor until the rated speed of the turbine generator set is reached. Only then is the static frequency converter reversed so as to transmit the power supplied by the generator to the grid.

c) In addition to the above-mentioned main function, the static frequency converter may perform both of the functions defined under a) and b).

The invention enables considerable savings to be made in the cost of a gas turbine and alternator set, and its electronic control cabinets. It also enables operating savings to be made.

With a single static frequency converter, it is possible to:

omit the step-down gear box which is expensive and wastes power;

optimize the speed of rotation of the gas turbine and of the turbine and alternator set, under full load or under partial load, thereby making the set more efficient;

eliminate the difficult problems of synchronization between the frequency of the grid and that of the alternator; and omit the control cabinets dedicated to exciting/regulating and synchronizing the generator.

The invention applies to any type of turbine (gas turbine, steam turbine) regardless of its power. The generator 25 may equally well be an alternator or an asynchronous generator.

I claim:

1. A turbine generator set comprising a turbine (100) and a generator (11) coupled to each other without a step-down gear box, and a static frequency converter (25) connected in series between said generator (11) and an AC electricity grid (13) having a given operating frequency, said static frequency converter (25) operating while the turbine generator set is generating electricity to convert the frequency of the voltage and of the current delivered by the generator (11) into the given operating frequency of the AC electricity grid (13), said turbine generator set being characterized in that, while the turbine generator set is being started, said static frequency converter (25) powers the generator (11) which operates as a motor so as to ignite the combustion chambers of the turbine (100), by taking power from the AC electricity grid (13).

2. A turbine generator set according to claim 1, characterized in that, with the generator (11) being an alternator (11) including an inductor (11A), and while the turbine generator set is generating electricity, said static frequency converter (25) acts on said inductor (11A) so as to excite and/or regulate said alternator (11).

3. A turbine generator set according to claim 1, characterized in that the static frequency converter (25) comprises two thyristor bridges (25A, 25B) controlled by measurement transformers (29, 30) for measuring the voltage and the current delivered by the generator (11).

4. A turbine generator set according to claim 1, characterized in that the static frequency converter (25) measures the load delivered at the AC electricity grid, and adjusts the signal to inductor (11A) which makes it possible to adjust the speed of rotation of the turbine generator set as a function of the load delivered to the AC electricity grid (13).

5. A turbine generator set according to claim 1, characterized in that the generator (25) is an alternator or an asynchronous generator.

6. A turbine generator set according to claim 1, further comprising a voltage measurement transformer and a current measurement transformer between said generator and said AC electrical grid; and in which said static frequency converter further comprises two thyristor bridges connected with at least one inductor between them, and controlled by inputs from said voltage and current measurement means.

7. A turbine generator set for direct coupling between a turbine and a generator operating at a different frequency from the frequency of an AC power grid, comprising:
- a turbine and a generator directly coupled to each other without a gearbox; and
- a static frequency converter connected between said generator and the power grid;
- wherein said static frequency converter changes the frequency of the electrical power delivered by the generator into the frequency of the AC power grid, when the turbine generator set is generating electricity; and
- wherein said static frequency converter converts the power from an AC power source into AC power to the generator at a different frequency from the AC power source, such that the generator operates as a motor, thereby starting the turbine.

8. A turbine generator set according to claim 7 further including means for measuring the voltage and current between the generator and the grid, and in which said static frequency converter includes at least two thyristor bridges, controlled in response to said voltage and current measurements.

9. A turbine generator set according to claim 8 further including an inductor disposed between said two thyristor bridges.

10. A turbine generator set according to claim 7 in which said generator is an alternator, including a field winding, and while said turbine generator is generating electricity, said static frequency converter adjusts the current in said field winding so as to regulate the speed of said alternator.

* * * * *